(12) United States Patent
Kobayashi et al.

(10) Patent No.: US 7,690,152 B2
(45) Date of Patent: Apr. 6, 2010

(54) OPENING AND CLOSING MEMBER CONTROL SYSTEM

(75) Inventors: Shigeru Kobayashi, Toyohashi (JP); Kazuyuki Hirai, Kasugai (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 852 days.

(21) Appl. No.: 11/390,418

(22) Filed: Mar. 28, 2006

(65) Prior Publication Data

US 2007/0084120 A1  Apr. 19, 2007

(30) Foreign Application Priority Data

Mar. 30, 2005  (JP) ............................. 2005-097240

(51) Int. Cl.
*E05F 15/02* (2006.01)
(52) U.S. Cl. .............................................. 49/28; 49/26
(58) Field of Classification Search ...................... 49/26, 49/27, 28, 360; 318/466–469, 280–286, 318/265, 266, 453
See application file for complete search history.

(56) References Cited

U.S. PATENT DOCUMENTS

| | | | |
|---|---|---|---|
| 4,870,333 A | | 9/1989 | Itoh et al. |
| 5,351,439 A | * | 10/1994 | Takeda et al. ................... 49/28 |
| 5,436,539 A | | 7/1995 | Wrenbeck et al. |
| 5,459,379 A | * | 10/1995 | Takeda et al. ................ 318/469 |
| 5,521,474 A | | 5/1996 | Hahn |
| 5,530,329 A | | 6/1996 | Shigematsu et al. |
| 5,539,290 A | | 7/1996 | Lu et al. |
| 5,932,931 A | * | 8/1999 | Tanaka et al. ............... 307/10.1 |
| 5,966,071 A | * | 10/1999 | Tsuge et al. ................. 340/438 |
| 5,977,732 A | * | 11/1999 | Matsumoto ................... 318/283 |
| 5,983,567 A | * | 11/1999 | Mitsuda .......................... 49/26 |
| 5,994,858 A | | 11/1999 | Miura |
| 6,100,658 A | | 8/2000 | Kume et al. |
| 6,150,784 A | | 11/2000 | Nagaoka |
| 6,150,785 A | * | 11/2000 | Butscher et al. .............. 318/468 |
| 6,271,512 B1 | * | 8/2001 | Lewis .......................... 250/221 |
| 6,297,605 B1 | * | 10/2001 | Butler et al. ................. 318/466 |
| 6,305,123 B1 | * | 10/2001 | Davies et al. ................... 49/26 |
| 6,366,042 B1 | * | 4/2002 | Gerbetz ....................... 318/286 |
| 6,377,009 B1 | * | 4/2002 | Philipp ........................ 318/468 |
| 6,448,729 B1 | * | 9/2002 | Davies et al. ................ 318/434 |

(Continued)

FOREIGN PATENT DOCUMENTS

JP   A-H7-158338   6/1995

(Continued)

*Primary Examiner*—Jerry Redman
(74) *Attorney, Agent, or Firm*—Posz Law Group, PLC

(57) ABSTRACT

An opening and closing member control system includes a rotation sensing device, which outputs a pulse signal synchronously to a movement of a window glass, and a controller, which senses pinching of an object by an opening and closing member based on the pulse signal. The controller has leaning stored data $\Delta\omega_m$ based on the pulse signal. The controller computes a rotational speed difference $\Delta\omega$ at a current position of the window glass based on the pulse signal while the window glass is driven in a closing direction. The controller computes a difference between the rotational speed difference $\Delta\omega$ and leaning stored data $\Delta\omega_m$ in such a manner that the controller determines whether the pinching of the object based on a comparison between the difference and a pinching determining threshold value $\beta$.

8 Claims, 6 Drawing Sheets

U.S. PATENT DOCUMENTS

| | | | |
|---|---|---|---|
| 6,452,353 B1 * | 9/2002 | Calamatas | 318/466 |
| 6,531,840 B2 * | 3/2003 | Sugawara | 318/445 |
| 6,794,837 B1 * | 9/2004 | Whinnery et al. | 318/282 |
| 6,894,451 B2 * | 5/2005 | Shinohara | 318/566 |
| 6,906,482 B2 * | 6/2005 | Shimizu et al. | 318/286 |
| 6,906,487 B2 * | 6/2005 | de Frutos | 318/468 |
| 6,940,246 B2 * | 9/2005 | Mochizuki et al. | 318/469 |
| 6,943,515 B2 * | 9/2005 | Kidokoro | 318/466 |
| 6,946,811 B2 * | 9/2005 | Kikuta et al. | 318/468 |
| 7,009,352 B2 * | 3/2006 | Yamamoto et al. | 318/466 |
| 7,021,001 B1 * | 4/2006 | Schooler | 49/28 |
| 7,038,413 B2 * | 5/2006 | Onozawa et al. | 318/443 |
| 7,038,414 B2 * | 5/2006 | Daniels et al. | 318/466 |
| 7,067,996 B2 * | 6/2006 | Yamamoto | 318/55 |
| 7,100,325 B2 * | 9/2006 | Ichinose | 49/168 |
| 7,132,813 B2 * | 11/2006 | Gregori et al. | 318/466 |
| 7,170,244 B2 * | 1/2007 | Choby | 318/280 |
| 7,224,136 B2 * | 5/2007 | Saitou et al. | 318/286 |
| 7,269,924 B2 * | 9/2007 | Otomo et al. | 49/506 |
| 7,362,068 B2 * | 4/2008 | Yamamoto | 318/469 |
| 2002/0157313 A1 * | 10/2002 | Fukazawa et al. | 49/26 |
| 2004/0104701 A1 * | 6/2004 | Ohshima | 318/445 |

FOREIGN PATENT DOCUMENTS

| | | |
|---|---|---|
| JP | A-H8-260810 | 8/1996 |
| JP | A-2001-248358 | 9/2001 |
| JP | A-2002-295128 | 9/2002 |

* cited by examiner

OPENING AND CLOSING MEMBER CONTROL SYSTEM

CROSS REFERENCE TO RELATED APPLICATION

This application is based on and incorporates herein by reference Japanese Patent Application No. 2005-97240 filed on Mar. 30, 2005. This application is also related to U.S. application Ser. No. 11/390,103, entitled "OPENING AND CLOSING MEMBER CONTROL SYSTEM," filed on Mar. 28, 2006.

BACKGROUND OF THE INVENTION

1. Field of the Invention

The present invention relates to an opening and closing member control system, which can detect pinching of an object by an opening and closing member.

2. Description of Related Art

In a case where a power window system of a vehicle is designed to limit a pinching of a foreign object, it is conventionally known that a moving range of a window is divided into a plurality of equally divided moving regions, and that a standard medium value indicating a load applied to the window is set to each of the divided moving regions in such a manner that the power window system determines the pinching based on a comparison between the standard medium value and an actual load during a closing operation of the window (see, for example, Japanese Unexamined Patent Publication No. H11-81794 corresponding to U.S. Pat. No. 5,994,858).

In the power window system disclosed in Japanese Unexamined Patent Publication No. H-11-81794, a first half region of each of the divided moving region is assigned the corresponding standard medium value, and a second half region thereof is assigned a complement standard medium value, which is an average value of the corresponding standard medium value of each divided moving region and another standard medium value, which is assigned to an adjacent one of each divided moving region.

In this way, by setting the corresponding standard medium value to each divided moving region, threshold values for determining the pinching can be set without increasing memory capacity of a memory very much.

Generally, in order to reliably detect the pinching which a pinching detecting load is low, it is preferable to set a low threshold value. However, when the threshold value is merely lowered, there appears a disadvantage that the pinching tends to be erroneously detected.

Also, even at the time of that the pinching does not occur, the load (sliding resistance) to the window is not constant but indicates an overlapped load between a large change element and a small change element (undulation element). Also, these change elements may change in accordance with time or a peripheral environment.

In a technology disclosed in Japanese Unexamined Patent Publication No. H11-81794, the threshold value of each of the first and second halves of the divided moving region is set constant. In this way, in a case where the threshold value is constant in a predetermined region, and the change element mimics a characteristic of the pinching, the pinching may be erroneously detected around ends of the predetermined region.

SUMMARY OF THE INVENTION

It is therefore an object of the present invention to provide an opening and closing member control system, which obviates or alleviates at least one of the above disadvantages.

To achieve the objective of the present invention, there is provided an opening and closing member control system that includes a drive means for driving an opening and closing member in an opening direction and a closing direction, a speed sensing means for outputting a speed measurement signal, which indicates a moving speed that corresponds to movement of the opening and closing member driven by the drive means, and a pinching sensing means for sensing pinching of an object by the opening and closing member based on the speed measurement signal. The pinching sensing means prestores at least one first amount of change in the moving speed, which is computed based on the speed measurement signal that is previously received while the opening and closing member is driven in the closing direction, the at least one first amount of change in the moving speed serving as learning stored data. The pinching sensing means computes a second amount of change in the moving speed at a current position of the opening and closing member based on the speed measurement signal that is received while the opening and closing member is driven in the closing direction. The pinching sensing means computes a difference between the second amount of change in the moving speed and the learning stored data, which corresponds to the current position of the opening and closing member. The pinching sensing means confirms the pinching of the object by the opening and closing member by a comparison between the difference and a pinching determining threshold value.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE PREFERRED EMBODIMENTS

An embodiment of the present invention will be described with reference to the accompanying drawings. It should be noted that the following structure, procedure or the like are not intended to limit a scope of the present invention and may be modified in various ways in consonance with the scope and spirit of the present invention.

Figure 1:
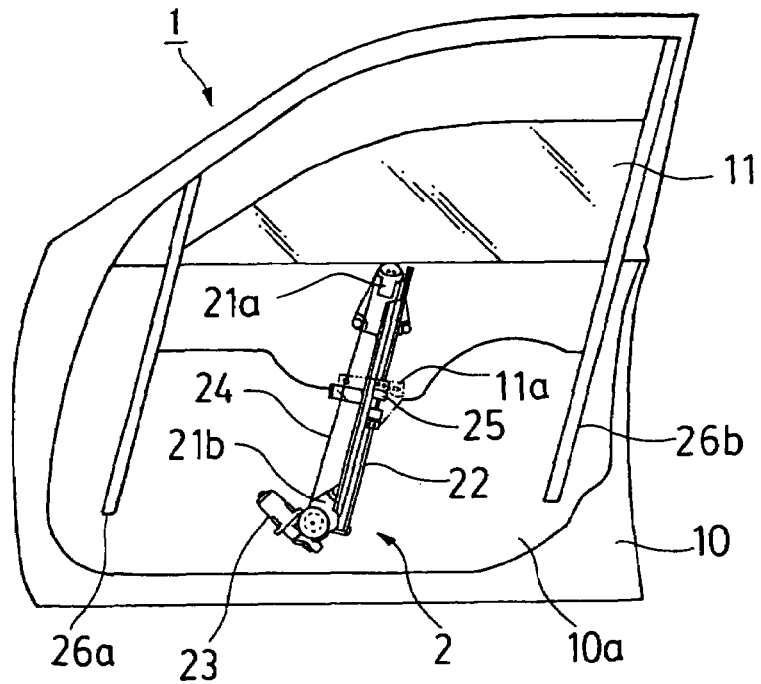
FIG. 1 is a diagram for describing a power window system according to an embodiment of the present invention.
Figure 2:
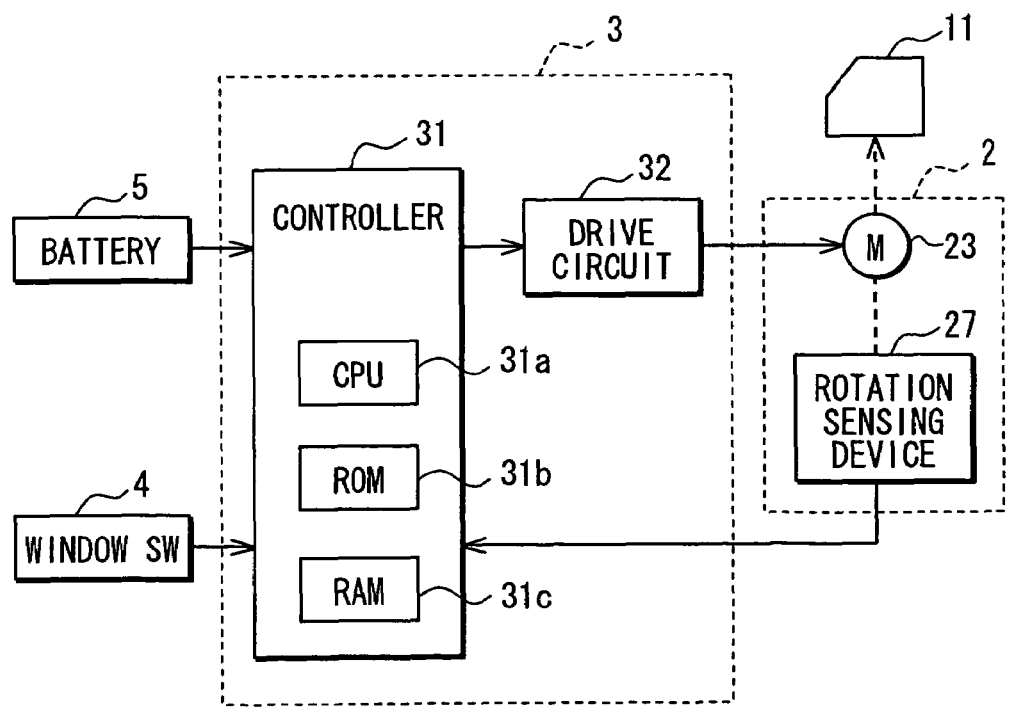
FIG. 2 is a diagram showing an electrical construction of the power window system of FIG. 1.

A control apparatus of a power window system according to the present embodiment will be described. FIG. 1 is a diagram showing the power window system 1 of the present embodiment, and FIG. 2 shows an electrical construction of the power window system 1 of the present embodiment. In the power window system 1 of the present embodiment, a window glass (window panel) 11, which serves as an opening and closing member arranged in a vehicle door 10, is raised and lowered (opened and closed) by rotation of a motor 23. The power window system 1 includes a drive arrangement (a drive means) 2, which is for driving the window glass 11 in an opening direction and a closing direction, a control arrangement (a control means) 3, which is for controlling an operation of the drive arrangement 2, and an operational switch (a window switch) 4, which is for inputting an operational command of an occupant.

The drive arrangement 2 includes upper and lower brackets 21a, 21b, a guide rail 22, a motor 23, an endless tape 24, a slider 25 and two guide frames 26a, 26b. The upper and lower brackets 21a, 21b are provided to an inner panel 10a of the door 10. The guide rail 22 is arranged to connect between the upper bracket 21a and the lower bracket 21b. The motor 23 is installed to the lower brackets 21b. The endless tape 24 is placed around the upper bracket 21a and a sprocket, which is connected to an output shaft of the motor 23, in such a manner that the endless tape 24 is rotatable. The slider 25 is slidably guided by the guide rail 22, which is installed to the tape 24. The guide frames 26a, 26b guide the window glass 11 in an opening/closing direction of the window glass 11. A carrier plate 11a, which supports a lower end of the window glass 11, is installed to the slider 25.

The motor 23 of the present embodiment is rotatable in both normal direction and a reverse direction upon receiving electric power from the control arrangement 3 (shown in FIG. 2). In the drive arrangement 2 of the present embodiment, when the motor 23 is rotated in the normal or reverse direction, a rotational force is transmitted to the tape 24 through the sprocket to rotate the tape 24. When the tape 24 is rotated, the slider 25 is guided in the upward or downward direction along the guide rail 22. When the slider 25 is guided in the upward or downward direction along the guide rail 22, the slider 25 moves the window glass 11 in the upward or downward direction through the carrier plate 11a along the guide frames 26a, 26b. As described above, the drive arrangement 2 lowers or raises the window glass 11 through the operation of the motor 23 to open or close the window opening of the door 10.

As shown in FIG. 2, a rotation sensing device 27, which serves as a speed sensing means, is provided integrally with the motor 23. The rotation sensing device 27 outputs a pulse signal (a speed measurement signal, a rotational speed signal), which is synchronized with the rotation of the motor 23, to the control arrangement 3. The rotation sensing device 27 of the present embodiment includes a plurality of Hall elements, which sense a magnetic change of a magnet, which rotates integrally with the output shaft of the motor 23. With the above construction, the rotation sensing device 27 outputs the pulse signal that is synchronized with rotation of the motor 23. That is, the rotation sensing device 27 outputs the pulse signal per unit displacement amount of the window glass 11 or per unit rotational angle of the motor 23. In this way, the rotation sensing device 27 can output the signal, which corresponds to the movement of the window glass 11 that is generally proportional to a rotational speed of the motor.

In the present embodiment, the Hall elements are used in the rotation sensing device 27. However, the rotation sensing device 27 is not limited to the one having the Hall elements. In other words, in place of the Hall elements, the rotation sensing device 27 may include any other appropriate arrangement, such as an encoder, as long as the other appropriate arrangement can effectively sense the rotational speed of the motor 23. Furthermore, in the present embodiment, the rotation sensing device 27 is provided integrally with the motor 23 to sense the rotational speed of the output shaft of the motor 23, which corresponds to the movement of the window glass 11. However, the present invention is not limited to this. The moving speed of the window glass 11 may be directly sensed by any other known method.

The control arrangement 3 of the present embodiment includes a controller 31 and a drive circuit 32. The controller 31 and the drive circuit 32 receive its electric power for operations from a battery 5 installed in the vehicle.

The controller 31 of the present embodiment includes a microcomputer, which has a CPU 31a, memories, such as a ROM (e.g., an EPROM) 31b, a RAM 31c, an input circuit (not shown) and an output circuit (not shown). The CPU 31a is interconnected with the memories, the input circuit and the output circuit through a bus line (not shown). The controller 31 is not limited to the above one. Alternatively, for example, the controller 31 may include a DSP or a gate array.

The controller 31 rotates the motor 23 in the normal or reverse direction through the drive circuit 32 based on an operational signal transmitted from the operational switch 4, so that the window glass 11 is moved in the upward or downward. Furthermore, the controller 31 receives the pulse signal from the rotation sensing device 27. Based on this pulse signal, the controller 31 can sense pinching of an object between an upper end portion of the window glass 11 and the window frame. When the pinching of the object is sensed, the controller 31 rotates the motor 23 in the opening direction through the drive circuit 32, so that the window glass 11 is opened. Therefore, the controller 31 of the present embodiment serves as a pinching sensing means.

The drive circuit 32 of the present embodiment includes FETs to change a polarity of the power supply to the motor 23 based on an input signal from the controller 31. Specifically, when the drive circuit 32 receives a normal rotation command signal from the controller 31, the drive circuit 32 supplies the electric power to the motor 23 in a manner that rotates the motor 23 in the normal direction. In contrast, when the drive circuit 32 receives a reverse rotation command signal from the controller 31, the drive circuit 32 supplies the electric power to the motor 23 in a manner that rotates the motor 23 in the reverse direction. Alternative to the FETs, the drive circuit 32 may include a relay circuit to change the polarity. Furthermore, the drive circuit 32 may be incorporated into the controller 31.

The controller 31 senses a respective leading edge and a respective trailing edge (the leading edge and the trailing edge being collectively referred to as pulse edges) of the respective pulse signal supplied to the controller 31. Based on an interval (a period) between the corresponding pulse edges, the controller 31 computes a rotational speed (a rotational period) of the motor 23. Also, based on a pulse difference of the respective pulse signal, the controller 31 senses the rotational direction of the motor 23. That is, the controller 31 indirectly computes the moving speed of the window glass 11 based on the rotational speed (the rotational period) of the motor 23 and determines the moving direction of the window glass 11 based on the rotational direction of the motor 23. Furthermore, the controller 31 counts the pulse edges. A pulse count value is increased or decreased depending on the opening or closing movement of the window glass 11. The controller 31 specifies an opening/closing position of the window glass 11 based on the pulse count value.

The operational switch 4 of the present embodiment may be a rocker witch, which is operable in two levels and includes a window open switch, window close switch and an auto switch. When the occupant operates the operational switch 4, a command signal for opening or closing the window glass 11 is outputted from the operational switch 4 to the controller 31.

Specifically, when the operational switch 4 is operated to a first level on one end side, the window open switch is turned on, so that a normal opening command signal for performing a normal opening operation of the window glass 11 (lowering the window glass 11 through a period of the operation) is outputted from the operational switch 4 to the controller 31. Furthermore, when the operational switch 4 is operated to a first level to the other end side, the window close switch is turned on, so that a normal closing command signal for performing a normal closing operation of the window glass 11 (raising the window glass 11 throughout a period of the operation) is outputted from the operational switch 4 to the controller 31.

Furthermore, when the operational switch 4 is operated to a second level beyond the first level on the one end side, the window open switch and the auto switch are both turned on, so that an automatically opening command signal for performing an automatic opening operation of the window glass 11 (lowering the window glass 11 all the way up to a fully opened position even if the operation of the operational switch 4 is stopped) is outputted from the operational switch 4 to the controller 31. Furthermore, when the operational switch 4 is operated to a second level beyond the first level on the other end side, the window close switch and the auto switch are both turned on, so that an automatically closing command signal for performing an automatic closing operation of the window glass 11 (raising the window glass 11 all the way up to a fully closed position even if the operation of the operational switch 4 is stopped) is outputted from the operational switch 4 to the controller 31.

The controller 31 drives the motor 23 through the drive circuit 32 to perform the normal opening operation of the window glass 11 throughout the period of receiving the normal opening command signal (throughout the period of the operation of the operational switch 4). Also, the controller 31 drives the motor 23 through the drive circuit 32 to perform the normal closing operation of the window glass 11 throughout the period of receiving the normal closing command signal (throughout the period of the operation of the operational switch 4).

Furthermore, when the controller 31 receives the automatically opening command signal from the operational switch 4, the controller 31 drives the motor 23 through the drive circuit 32, so that the automatic opening operation is performed to lower the window glass 11 all the way to the fully opened position. Furthermore, when the controller 31 receives the automatically closing command signal from the operational switch 4, the controller 31 drives the motor 23 through the drive circuit 32, so that the automatic closing operation is performed to raise the window glass 11 all the way to the fully closed position.

At the time of performing the closing operation (the normal closing operation or the automatic closing operation) of the window glass 11, the controller 31 monitors occurrence of the pinching by the window glass 11. When the pinching occurs, the moving speed of the window glass 11 and the rotational speed of the motor 23 are decreased (the rotational period is increased). Thus, the controller 31 of the present embodiment always monitors the change in the rotational speed of the motor 23.

The controller 31 of the present embodiment first detects start of the pinching based on the change in the rotational speed. Then, when a change amount of the rotational speed since the time of sensing the start of the pinching reaches a predetermined amount, the controller 31 determines (confirms) that the pinching has occurred.

When it is determined that the pinching has occurred, the controller 31 reverses the rotation of the motor 23 release the object, which is pinched by the window glass 11, so that the window glass 11 is lowered by a predetermined amount. Alternatively, when it is determined that the pinching has occurred, the controller 31 may stop the motor 23 to stop the further closing movement of the window glass 11 and thereby to allow release of the object pinched by the window glass 11.

Figure 3:
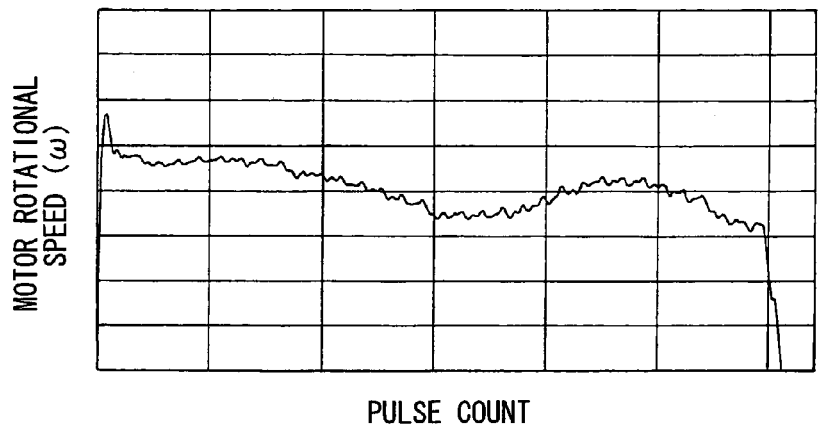
FIG. 3 is a graph showing a change condition in a motor rotational speed under a normal state of the power window system of FIG. 1.

Next, the pinching determination operation of the power window system 1 of the present embodiment will be generally described with reference to FIG. 3 to FIG. 5C. FIG. 3 shows a change condition of a rotational speed $\omega$ of the motor 23 when the window glass 11 is moved from the fully opened position to the fully closed position at the time of the normal state where the pinching of the object does not occur. The axis of abscissas corresponds to the pulse count number. In this way, the graph of the rotational speed $\omega$ includes a minute sliding change element (undulation element) because the window glass 11 receives external forces, such as sliding resistance. The sliding change element mimics a change of the rotation speed at the time of the pinching. Also, the sliding change element reoccurs correspondingly to the pulse count number.

Figure 4A:
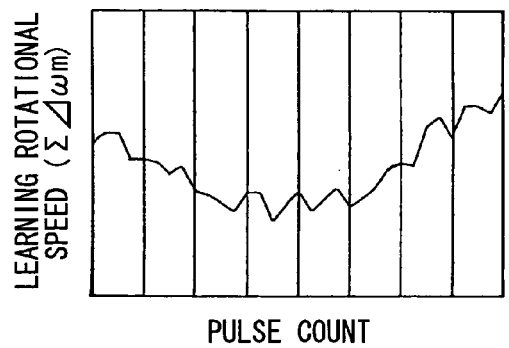
FIG. 4A is a graph showing a relationship between a pulse count and a learning rotational speed in the power window system of FIG. 1.
Figure 4B:
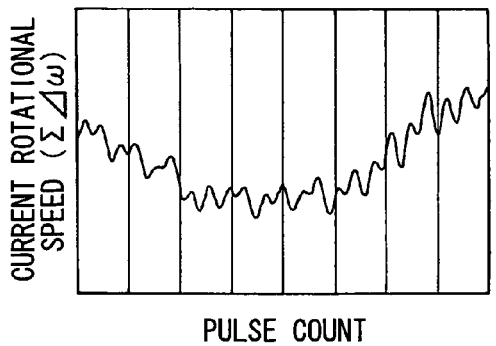
FIG. 4B is a graph showing a relationship between the pulse count and a current rotational speed in the power window system of FIG. 1.
Figure 4C:
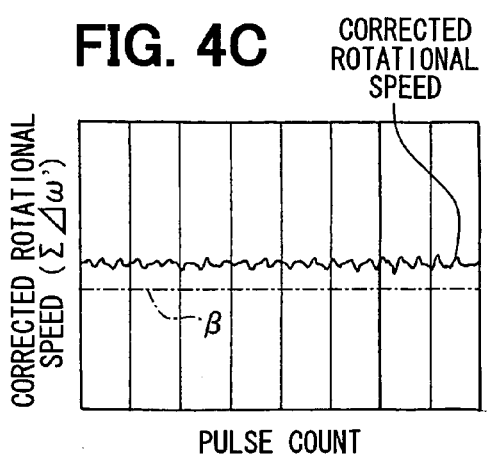
FIG. 4C is a graph showing a relationship between the pulse count and a corrected rotational speed in the power window system of FIG. 1.

In FIGS. 4A to 4C, the axis of abscissas shows the pulse count number, which corresponds to a position of the window glass 11. The axis of the ordinates corresponds to rotational speeds.

The power window system 1 of the present embodiment computes the rotational speed $\omega$ of the motor 23 based on the pulse signal supplied from the rotation sensing device 27. Then, the power window system 1 computes a rotational speed difference $\Delta\omega$ based on the rotational speed $\omega$ as described later. Also, learning stored data (learning rotational speed difference) $\Delta\omega_m$, which serves as an amount of change in a moving speed, is computed based on the rotational speed difference $\Delta\omega$. The learning stored data $\Delta\omega_m$ is prestored in the memory in the controller 31. FIG. 4A shows a change condition of the learning rotational speed based on the thus computed learning stored data $\Delta\omega_m$ (i.e., the learning rotational speed is a cumulative value of the learning stored data $\Delta\omega_m$).

Also, in the present embodiment, when the power window system 1 is operated to close the window glass 11, the rotational speed $\omega$ of the motor 23 at a current position of the window glass 11 is computed. Based on the rotational speed $\omega$, a rotational speed difference $\Delta\omega$ is computed correspondingly to every detected pulse edge as described later. FIG. 4B shows a change condition of the thus computed current rotational speed (i.e., a cumulative value of the rotational speed difference $\Delta\omega$).

The current rotational speed (and the rotational speed difference $\Delta\omega$) includes the sliding change element, which is unique to the window glass 11. Thus, an actual rotational speed (corrected rotational speed), which is generated due to the external force, is corrected data, which is calculated by subtracting the learning rotational speed from the current rotational speed. Here, the learning rotational speed is based on the learning stored data $\Delta\omega_m$. FIG. 4C shows a pinching determining threshold value $\beta$ and a change condition of the thus computed corrected rotational speed, and the pinching determining threshold value $\beta$ and the thus computed corrected rotational speed are used to determine the pinching. As shown in FIG. 4C, when the pinching does not occur, the actual rotational speed (corrected rotational speed), which is not influenced by the sliding change element, fluctuates a little around zero.

Also, as described later, the pinching determining threshold value $\beta$ is corrected based on the corrected rotational speed difference $\Delta\omega'$ as the need arises. Therefore, the pinching determination operation is performed based on the pinching determining threshold value $\beta$, which is set (corrected) based on the rotational speed of the current time. Thus, even when the disturbance occurs at a position, where the rotational speed fluctuates widely at a normal state, the erroneous pinching determination may be limited because there is wide enough margin between the corrected rotational speed difference $\Delta\omega'$ and the pinching determining threshold value $\beta$. Also, the pinching may be quickly detected because the more margin than is needed is not set for the threshold value.

The learning stored data $\Delta\omega_m$ for every n-th pulse edge is stored in the present embodiment. (The n indicates a natural number, which is two or more.) Thus, the memory capacity of the controller 31 can be reduced compared with the case where the learning stored data $\Delta\omega_m$ for every pulse edge is stored. That is, the amount of change in the moving speed (rotational speed) at each of divided ranges is stored to serve as the learning stored data $\Delta\omega_m$. Here, the moving range of the opening and closing member is divided into a plurality of divided ranges. Then, the memory capacity for storing the learning stored data $\Delta\omega_m$ can be reduced. In the present embodiment, the rotational speed difference $\Delta\omega$ at the current position of the window glass 11 is computed every time the pulse edge is detected. The learning stored data $\Delta\omega_m$, which serves as the sliding change element, is read from the memory. A difference is computed by subtracting the learning stored data $\Delta\omega_m$ from the current rotational speed difference $\Delta\omega$.

Thus, even in a case where the change elements in the amount of change in the moving speed (rotational speed) mimics that at the occurrence of the pinching, and is overlapped by that due to the external force, the erroneous pinching determination can be limited.

Figure 5A:
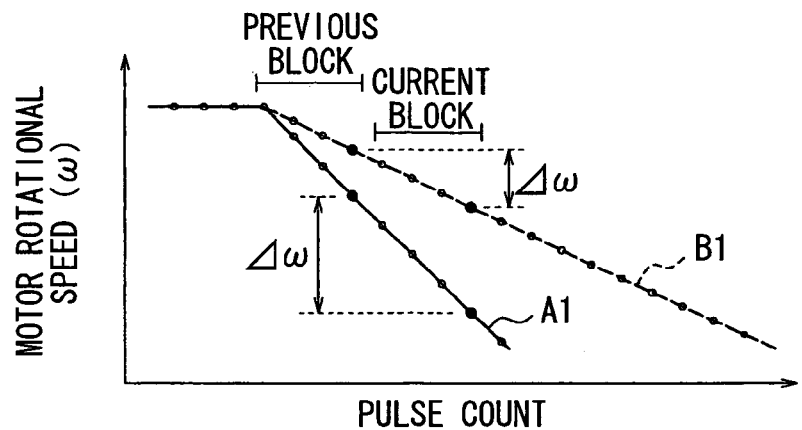
FIG. 5A is a graph showing a relationship between the pulse count and the rotational speed during a pinching determination process.
Figure 5B:
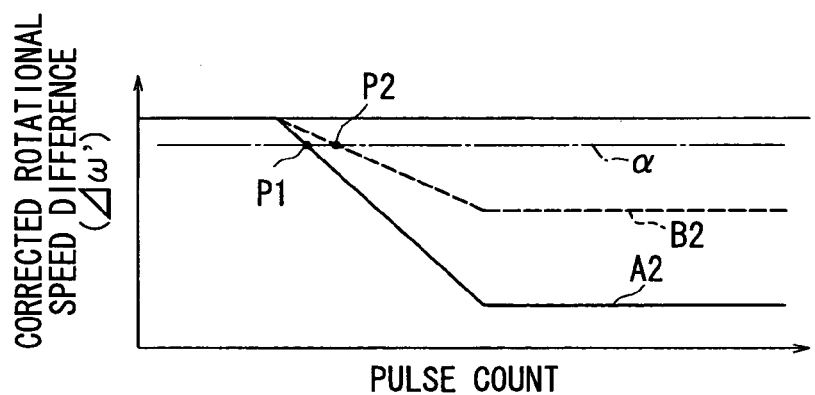
FIG. 5B is a graph showing a relationship between the pulse count and a corrected rotational speed difference during the pinching determination process.
Figure 5C:
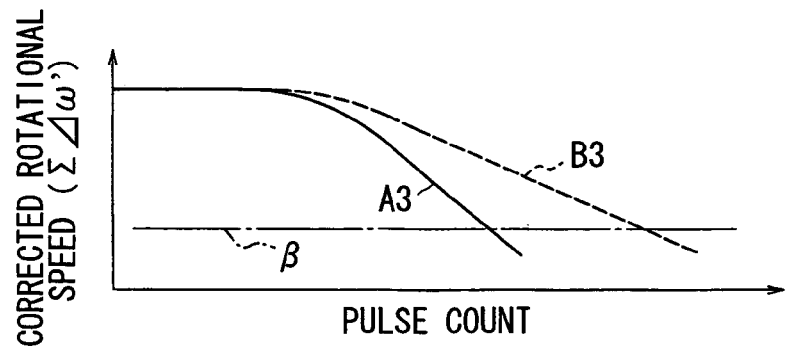
FIG. 5C is a graph showing a relationship between the pulse count and the corrected rotational speed during the pinching determination process.

Furthermore, FIGS. 5A to 5c are diagrams for describing the pinching determination process. Here, the change condition is simplified to facilitate understanding of the pinching determination process.

Also, FIG. 5A shows a change condition of the rotational speed $\omega$ at the time of occurrence of the pinching. In FIG. 5a, the axis of the ordinates corresponds to the motor rotational speed $\omega$, and the axis of abscissas corresponds to the pulse count number. In FIG. 5A, the rotation speed $\omega$ of the motor 23 is decelerated by the pinching in the middle of the rotation of the motor 23. A data line A1 indicates a state where the rotational speed $\omega$ is decelerated at a relatively high deceleration rate at the state where a hard object is pinched. A data line B1 indicates a state where the rotational speed $\omega$ is decelerated at a relatively low deceleration rate at the state where a soft object is pinched. In FIG. 5B and FIG. 5C, data lines A2, A3 correspond to the state where the hard object is pinched, and data lines B2, B3 correspond to the state where the soft object is pinched.

Also, in the power window system 1 of the present embodiment, based on data of the rotational speed $\omega$, there is computed the rotational speed difference $\Delta\omega$, which is a difference between a rotational speed $\omega$ of the current time and a rotational speed $\omega$ of a previous time, which previously measured several pulse edges before the measurement of that of the current time. The rotational speed difference $\Delta\omega$ corresponds to the amount of change (change rate) in the rotational speed (moving speed).

In the power window system 1 of the present embodiment, as described above, the corrected rotational speed difference $\Delta\omega'$, which serves as the change element due to the actual external force, is computed by subtracting the sliding change element (learning stored data $\Delta\omega_m$) from the rotational speed difference $\Delta\omega$, which is computed based on the rotational speed $\omega$. The corrected rotational speed difference $\Delta\omega'$ serves as corrected data of the amount of change (change rate) in the moving speed (rotational speed). FIG. 5B shows the change condition of the corrected rotational speed difference $\Delta\omega'$.

It is determined whether the thus computed corrected rotational speed difference $\Delta\omega'$ exceeds a change determining threshold value $\alpha$. When the corrected rotational speed difference $\Delta\omega'$ exceeds the change determining threshold value $\alpha$, it is determined that the pinching has started. In FIG. 5B, the start of pinching is detected at points P1, P2. However, the motor 23 continues rotation, and the window glass 11 keeps moving upward. The change determining threshold value $\alpha$ is set in such a manner that even when the power window system 1 pinches the soft object, the corrected rotational speed difference $\Delta\omega'$, which is influenced by the pinching, can exceed the threshold value $\alpha$.

In this way, once the start of the pinching is detected, in the power window system 1, it is determined whether a cumulative value (total amount) of the corrected rotational speed difference $\Delta\omega'$ (i.e., the actual rotational speed without the sliding change element, that is, the corrected rotational speed) exceeds the pinching determining threshold value $\beta$. When the corrected rotational speed exceeds the pinching determining threshold value $\beta$, the pinching is detected (confirmed). FIG. 5C shows a change condition of the cumulative value of the corrected rotational speed difference $\Delta\omega'$ (corrected rotational speed). The controller 31 determines (confirms) the occurrence of the pinching when the cumulative value exceeds the pinching determining threshold value $\beta$.

As discussed above, in the power window system 1 of the present embodiment, two threshold values are set. One of the threshold values, which is the change determining threshold value $\alpha x$, is set for the corrected rotational speed difference Δω'. The other one of the threshold values, which is the pinching determining threshold value β, is set for the corrected rotational speed (cumulative value of the corrected rotational speed difference Δω'). Therefore, the determination subjects of these threshold values differ from one another.

Also, in the power window system 1 of the present embodiment, the occurrence of the pinching is not confirmed based on a elapsed time or the number of pulse signals since the time of that the corrected rotational speed difference Δω' exceeds the change determining threshold value α. However, the pinching is confirmed based on the total amount of the corrected rotational speed difference Δω' since the time of that the corrected rotational speed difference Δω' exceeds the change determining threshold value α.

Therefore, in the power window system 1 of the present embodiment, the pinching can be effectively detected without damaging the pinched object because the pinching load may not be excessively increased when the object is pinched.

Also, in the power window system 1 of the present embodiment, even when the soft object is pinched, the corrected rotational speed difference Δω' exceeds the change determining threshold value α at a relatively early stage of the pinching. Thus, the pinching is effectively determined when the cumulative value of the corrected rotational speed difference Δω' since then exceeds the pinching determining threshold value β. In this case, the pinched object is soft, so that the corrected rotational speed difference Δω' does not become a small value (i.e., a large value at the time of seeing it as an absolute value). However, once the change determining threshold value α is exceeded, the cumulation of the corrected rotational speed difference Δω' is started such that the pinching can be reliably determined at the time of that the cumulative value exceeds the pinching determining threshold value β.

Also, similarly to the case of pinching the soft object, even in a case of pinching an object of an intermediate hardness, the corrected rotational speed difference Δω' exceeds the change determining threshold value α in an early stage and the cumulation of the corrected rotational speed difference Δω' is started. Thus, the pinching can be reliably determined when the cumulative value exceeds the pinching determining threshold value β.

Therefore, in the power window system 1 of the present embodiment, the pinching can be reliably determined at the low load regardless of hardness or softness of the pinched object.

Also, in the present embodiment, it is determined that the pinching has started when the corrected rotational speed difference Δω', which is not influenced by the sliding change element, exceeds the change determining threshold value α. Then, the pinching is determined when the cumulative value of the corrected rotational speed difference Δω' since then exceeds the pinching determining threshold value β. Thus, an occurrence of the erroneous pinching determination may be limited substantially compared with the case of that the pinching is determined when a specific value, which is merely computed by subtracting the sliding change element from the rotational speed ω, exceeds a threshold value.

In the case where the pinching is determined when the specific value, which is merely computed by subtracting the sliding change element from the rotational speed ω, exceeds the threshold value, the moving range of the window glass needs to be divided into a plurality of divided ranges, each of which has a corresponding threshold value, in consideration of the memory capacity. That is, the threshold value is set step wise in the moving range. Also, in the pinching determination process, it is determined whether the corrected value exceeds the threshold value of each divided range. The corrected value, which is computed by subtracting the sliding change element from the rotational speed ω, fluctuates widely. Thus, when the external force, which mimics the pinching, is applied, the corrected value may exceed the threshold value around the end of each divided range such that the pinching may be erroneously detected.

However, in the present embodiment, in the determination of the start of the pinching, it is determined whether the corrected rotational speed difference Δω' exceeds the change determining threshold value α. The corrected rotational speed difference Δω' fluctuates around zero and fluctuates a little. Thus, even when the change determining threshold value α is constant at each corresponding divided range, and when the external force that mimics the pinching is applied, the corrected rotational speed difference Δω' can be limited from exceeding the change determining threshold value α around the end of the divided range.

Specifically, the corrected data (corrected rotational speed difference) Δω', which is computed by subtracting the learning stored data $\Delta\omega_m$ from the amount of change (rotational speed difference) Δω of the moving speed (rotational speed), fluctuates a little around zero at the time of normal state where the pinching does not occur. Thus, even when the threshold value is set step wise, the erroneous pinching determination due to a decrease of a margin for the threshold value around the end of the divided range may be limited.

Moreover, in the present embodiment, even when the corrected rotational speed difference Δω' exceeds the change determining threshold value α, the pinching is not confirmed if the cumulative value of the corrected rotational speed difference Δω' does not exceed the pinching determining threshold value β. Thus, the pinching may be limited from being erroneously determined.

Figure 6:
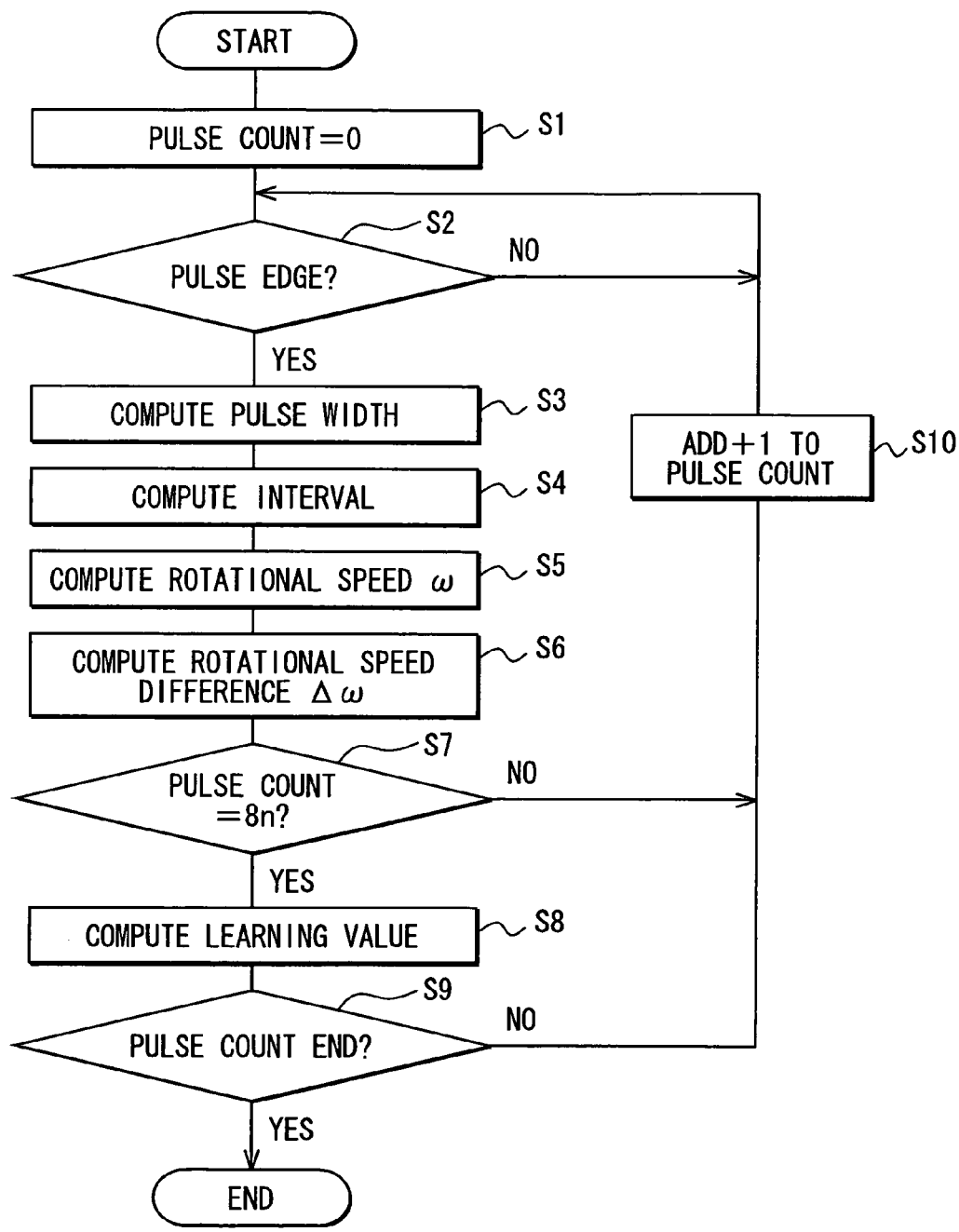
FIG. 6 is a process flow of generating learning stored data.

Next, a learning stored data generating process by the controller 31 of the present embodiment will be described with reference to FIG. 6. In this process, the learning stored data $\Delta\omega_m$ is stored in the memory included in the controller 31 every time the window glass 11 is operated from the fully opened state to the fully closed state while the pinching does not occur.

Firstly, the pulse count is set at zero because the window glass is at the fully opened state at step S1. Then, at step S2, the controller 31 determines whether the pulse edge is detected by processing the pulse signal received from the rotation sensing device 27.

When the pulse edge is not detected at step S2 (step S2; NO), step S2 is repeatedly executed. In contrast, when the pulse edge is detected at step S2 (step S2; YES), at step 3, the controller 31 computes a pulse width T(0), which is a time interval between the currently sensed pulse edge and the previously sensed pulse edge. In the present embodiment, the pulse widths T(0) to T(3) are renewed and stored to serve as the pulse width T. The pulse width T(0) is computed every time the new pulse edge is detected, and the previously computed pulse widths T(0) to T(2), which are computed at the time of sensing the previous pulse edge, are shifted to the pulse widths T(1) to T(3). Then, the previous pulse width T(3) is erased.

When the pulse width T is renewed, a pulse interval P is computed at step S4. Specifically, the controller 31 sums all pulse widths T(0) to T(3). Thus, the pulse interval between the current pulse edge and another pulse edge, which is detected four pulse edges before the detection of the current pulse edge, is computed.

Then, at step S5, a rotational speed $\omega(0)$ is computed by calculating an inverse number of the pulse period P, which is computed at step S4. The rotational speed $\omega(0)$ is proportional to the rotational speed of the motor 23. In this way, the rotational speed $\omega(0)$ is computed based on the pulse interval between the current pulse edge and another pulse edge, which is detected four pulse edges before the detection of the current pulse edge. Thus, the amount of change in the rotational speed $\omega$ due to the variation in the sensor Duty can be alleviated.

Eight data sets of rotational speeds $\omega(0)$ to $\omega(7)$ are renewed and stored to serve as the rotational speed $\omega$. New rotational speed $\omega(0)$ is computed every time the pulse edge is sensed. The rotational speeds $\omega(0)$ to $\omega(6)$, which are computed at the time of sensing the previous pulse edge, are shifted to the rotational speeds $\omega(1)$ to $\omega(7)$. The previous rotational speed $\omega(7)$ is erased.

At step S6, an (average) rotational speed difference (change rate of the rotational speed difference) $\Delta\omega(0)$ is computed. Specifically, the controller 31 sets the rotational speeds $\omega(0)$ to $\omega(3)$ to serve as the current block data, and sets the rotational speeds $\omega(4)$ to $\omega(7)$ to serve as the previous block data. The controller 31 subtracts a sum of the rotational speeds of the previous block data from a sum of the rotational speeds of the current block data. Thus, there is computed a rotational speed difference between a current rotational speed and another rotational speed, which corresponds to four pulse edge before the current rotational speed. Here, the rotational speed difference $\Delta\omega$ may be divided by a number of summed rotational speeds $\omega$ (four in the present embodiment). In this way, the rotational speed difference $\Delta\omega$ is computed based on a plurality of rotational speeds co so that a phase difference among the rotational speeds $\omega$ can be alleviated.

Eight data sets of rotational speed differences $\Delta\omega(0)$ to $\Delta\omega(7)$ are renewed and stored to serve as the rotational speed difference $\Delta\omega$. New rotational speed $\Delta\omega(0)$ is computed every time the pulse edge is sensed. The rotational speed differences $\Delta\omega(0)$ to $\Delta\omega(6)$, which are computed at the time of sensing the previous pulse edge, are shifted to the rotational speed differences $\Delta\omega(1)$ to $\Delta\omega(7)$. The previous rotational speed difference $\Delta\omega(7)$ is erased.

Then, at step S7, it is determined whether the pulse count is a multiple of eight (8n). When the pulse count is the multiple of eight (step S7; YES), a computing process is executed to compute the learning stored data $\Delta\omega_m(n)$ to serve as the amount of change in the moving speed. Specifically, the controller 31 performs an operation for summing the rotational speed differences $\Delta\omega(0)$ to $\Delta\omega(7)$. In the present embodiment, the learning stored data $\Delta\omega_m(n)$ is stored every eight pulse edges. Here, 1 is added to n at every eighth pulse edge from the fully opened state. That is, in the present embodiment, the moving range of the window glass 11 is divided into a plurality of divided ranges at every eighth pulse edge. Each divided range is assigned a corresponding learning stored data $\Delta\omega_m$. For example, the learning stored data $\Delta\omega_m(n)$, which corresponds to the pulse edge (pulse count) numbers "8n" to "8n+7", is stored.

Thus, in the present embodiment, one value represents the learning values for eight pulse edges. Therefore, the memory capacity can be reduced.

Here, in the present embodiment, the learning stored data $\Delta\omega_m$ represents the learning values for eight pulse edges. However, it is not limited to this, and the learning stored data $\Delta\omega_m$ may be alternatively be divided by eight to be converted into a value, which corresponds to one pulse edge. Also, in the present embodiment, the learning stored data $\Delta\omega_m$ is stored for every eighth pulse edge. However, it is not limited to this.

The learning stored data $\Delta\omega_m$ may be alternatively stored for each of any multiple pulse edges.

In contrast, when the pulse count is not the multiple of eight (step S7; NO), the controller 31 moves to step S10, where the pulse count is incremented by one, and the controller 31 returns to step S2. When the learning stored data $\Delta\omega_m(n)$ is computed at step S8, the controller 31 moves to step S9, where it is determined whether the pulse count corresponds to the fully closed state of the window glass 11. When the pulse count corresponds to the fully closed state (step S9; YES), the process is ended. Thus, the learning stored data $\Delta\omega_m$ of the every range is determined and stored in the memory. In contrast, when the pulse count does not corresponds to the fully closed state (step S9; NO), step S10 is executed.

In this way, the controller 31 of the present embodiment computes the learning stored data $\Delta\omega_m$ during the operation of the window glass 11 so that the controller 31 eventually stores every learning stored data $\Delta\omega_m$ in the memory. When the pinching is sensed, an interrupt process is executed to prevent the learning stored data $\Delta\omega_m$ from being stored in the memory.

Figure 7:
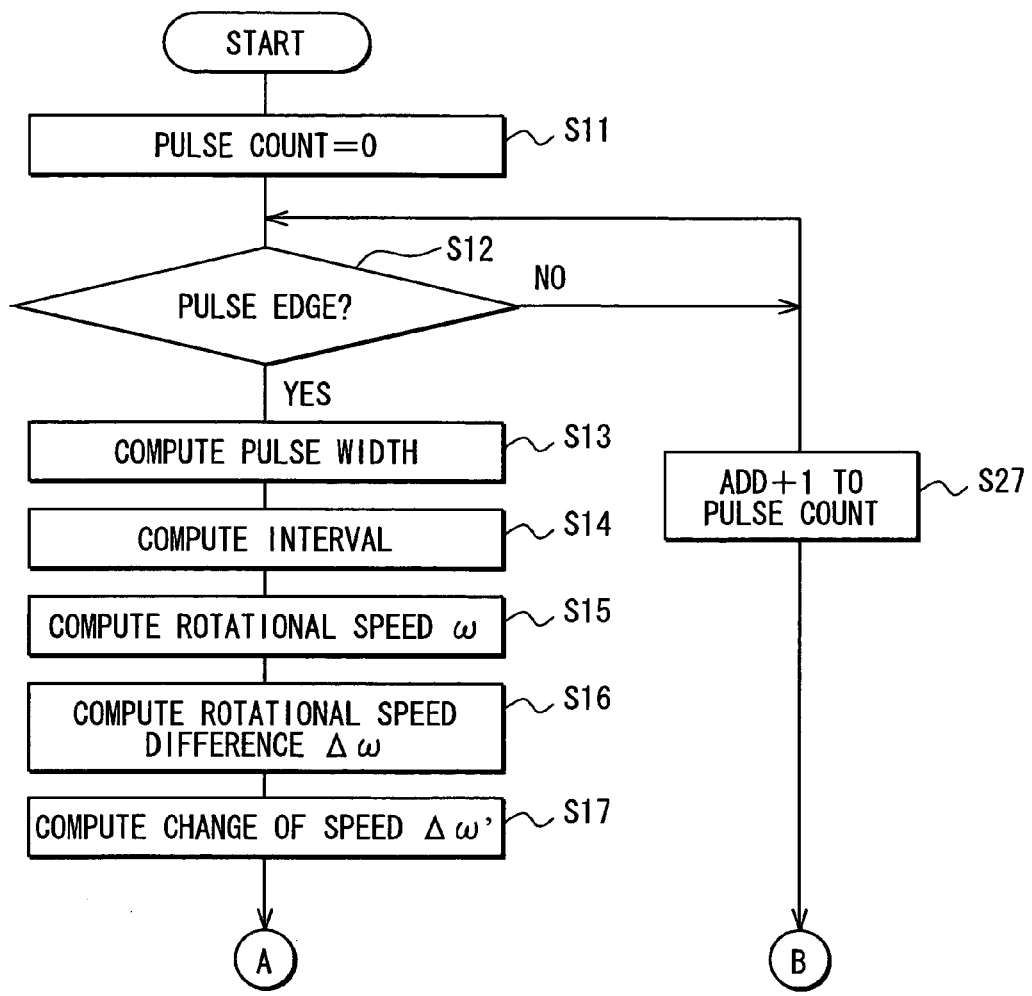
FIG. 7 is a flowchart for describing the pinching determination process.
Figure 8:
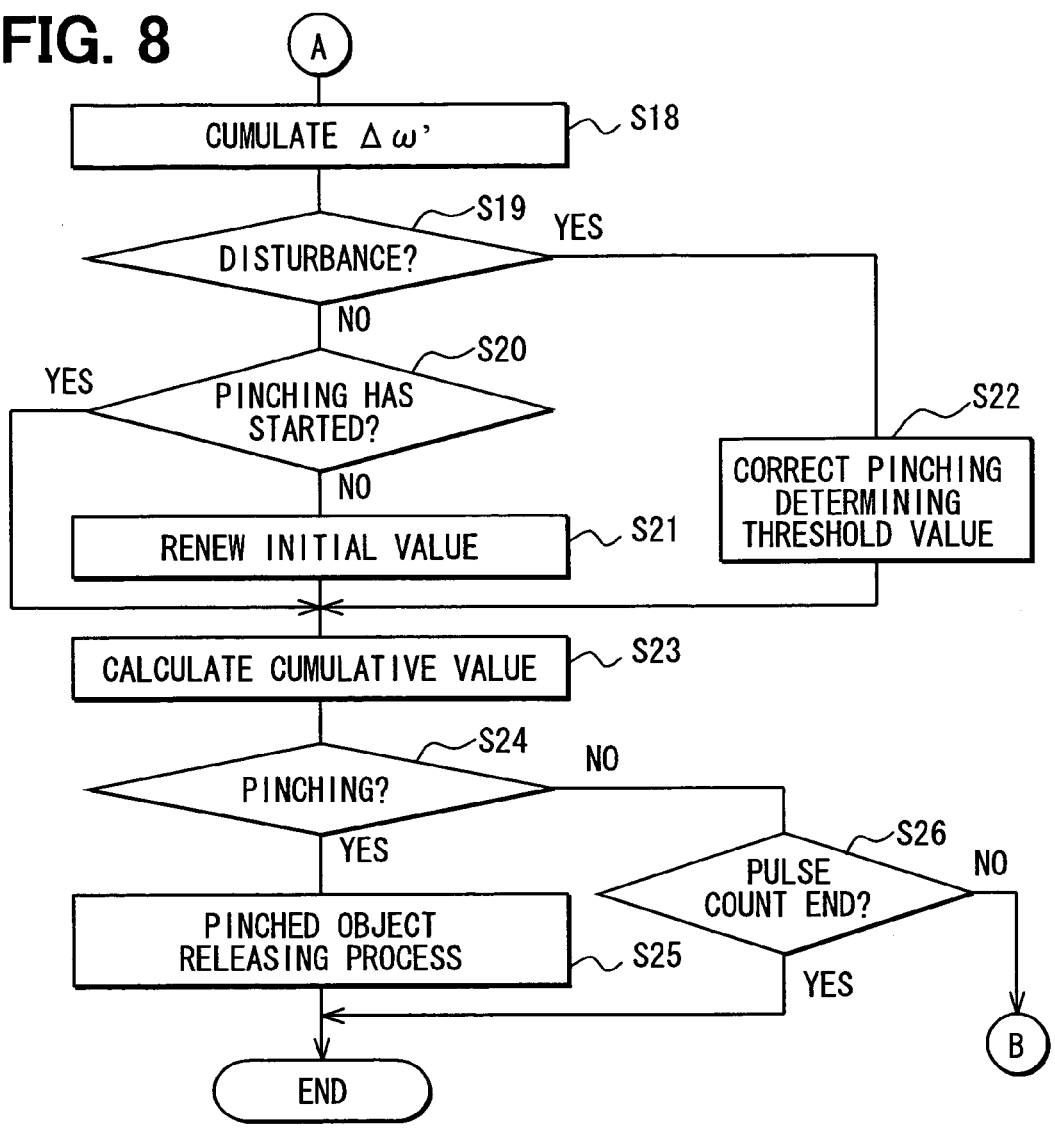
FIG. 8 is a continued flowchart, which is continued from the flowchart of FIG. 7, for describing the pinching determination process.

Next, the pinching determination process of the controller 31 will be described with reference to FIG. 7 and FIG. 8. Step S11 to step S16 corresponds to step S1 to step S6 in the above learning stored data generating process. Thus, explanation thereof is omitted.

At step S16, the rotational speed difference $\Delta\omega(0)$, which corresponds to the current pulse count, is computed. At step S17, the controller 31 reads the learning stored data $\Delta\omega_m$, which corresponds to the current pulse count, from the learning stored data $\Delta\omega_m$ stored in the memory. Then, a rotational speed difference corresponding to single pulse edge amount, which is obtained by dividing the learning stored data $\Delta\omega_m$ by eight, is subtracted from the rotational speed difference $\Delta\omega(0)$ to compute the corrected rotational speed difference $\Delta\omega'(0)$. Here, when the rotational speed difference corresponding to the single pulse edge amount is prestored in the memory, the learning stored data $\Delta\omega_m$ does not need to be divided by eight.

When the corrected rotational speed difference $\Delta\omega'(0)$ is computed, the controller 31 cumulates the computed corrected rotational speed difference $\Delta\omega'(0)$ on the basis of a predetermined position of the window glass 11 (step S18).

Next, it is determined whether the computed corrected rotational speed difference $\Delta\omega'(0)$ exceeds a disturbance determining threshold value γ on a positive side at step 19. The window glass 11 may receive a shock due to the disturbance, in such a case where the vehicle runs on to a step or the window glass 11 is closed. As a result, the rotational speed of the motor 23 may be influenced. In the present embodiment, the above described process limits the erroneous detection of the pinching caused by the above-described disturbance.

Figure 9:
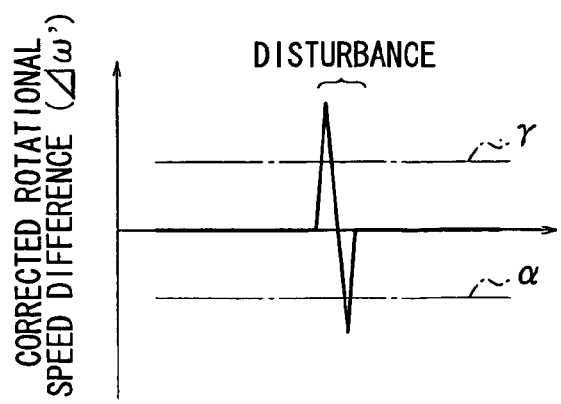
FIG. 9 is a diagram for describing the corrected rotational speed difference at the time of occurrence of disturbance.

As shown in FIG. 9, when the disturbance is applied, the corrected rotational speed difference $\Delta\omega'$ (rotational speed difference $\Delta\omega$) may be changed significantly on the positive side or the negative side. The significant change in the corrected rotational speed difference $\Delta\omega'$ on the positive side indicates that the rotation of the motor 23 is accelerated in the closing direction of the window glass 11. In contrast, the significant change in the corrected rotational speed difference $\Delta\omega'$ on the negative side indicates that the rotation of the motor 23 is decelerated. This significant change in the corrected rotational speed difference $\Delta\omega'$ on the negative side caused by the disturbance mimics the change in the corrected rotational speed difference $\Delta\omega'$ at the time of the pinching. Here, the disturbance determining threshold value γ is a value that is set on the positive side. When the corrected rotational speed difference $\Delta\omega'$ exceeds the disturbance determining threshold value γ on the positive side, the controller 31 of the present embodiment determines that the disturbance has occurred.

When it is determined that the disturbance has occurred (step S19; YES), the controller 31 increases the pinching determining threshold value β on the negative side (step S22) and moves to step S23. In this way, even when the corrected rotational speed difference Δω' changes significantly on the negative side due to the disturbance, and therefore the start of the pinching is erroneously detected, the cumulative value of the corrected rotational speed differences Δω' does not exceed the increased pinching determining threshold value β. Thus, it is possible to limit the erroneous determination of the occurrence of the pinching. In the present embodiment, the disturbance determining threshold value γ is set independently of the change determining threshold value α. Alternatively, for example, the disturbance determining threshold value γ may be set to a value, which has the same absolute value with the change determining threshold value α but has an opposite sign from the change determining threshold value α. In this way, the pinching determining threshold value β is corrected based on the actual change of the rotational speed difference (the corrected rotational speed difference Δω'). Therefore, the threshold value can be set correspondingly to the actual change of the rotation. Thus, it is possible to limit the erroneous determination due to the disturbance.

When it is determined that the disturbance has not occurred at step S19 (step S19; NO), the controller 31 performs a pinching start determination process for determining the star of the pinching (step S20). Specifically, when the corrected rotational speed difference Δω' exceeds the change determining threshold value α on the negative side, it is determined that the pinching has started. In contrast, when the corrected rotational speed difference Δω' does not exceed the change determining threshold value α on the negative side, it is determined that pinching has not started.

When it is determined that the pinching has started (step S20; YES), the controller 31 moves to step S23. In contrast, when it is determined that the pinching has not started (step S20; NO), each of the cumulative value of the corrected rotational speed differences Δω' and the pinching determining threshold value β is set to its initial value at step S21. Specifically, the cumulative value of the corrected rotational speed differences Δω', which is computed at step S18, is set as an initial amount of change $S_0$ of the corrected rotational speed, and the pinching determining threshold value β is returned to the normal value, which has not been increased. As discussed above, when it is determined that the period of the disturbance ends, the pinching determining threshold value β is returned to the normal value, and the normal process is resumed.

Then, at step S23, the computation process for computing the total amount of change S in the corrected rotational speed is performed. Specifically, the controller 31 subtracts the cumulative value of the corrected rotational speed differences Δω', which is computed at step S18, from the initial amount of change $S_0$ (the cumulative value of the corrected rotational speed differences Δω'), which is set at step S21 right before the determination of the start of the pinching. Thus, the amount of change S in the actual rotational speed (corrected rotational speed) since the start of the pinching (the cumulative value of the corrected rotational speed differences Δω') is computed. In this way, the change in the rotational speed caused by the pinching (i.e., the change corresponding to the pinching load) can be reliably computed.

In the present embodiment, the difference in the amount of change from the reference value is computed to compute the amount of change in the cumulative value of the corrected rotational speed differences Δω' since the start of the pinching. However, it is not limited to this. When the start of the pinching is not detected, the cumulative value of corrected rotational speed differences Δω' may be initialized. In contrast, when the start of the pinching is detected, the initialization of the cumulative value of the corrected rotational speed differences Δω' is not performed, and the corrected rotational speed differences Δω' may be cumulated only for those after the detection of the start of the pinching to compute the amount of change S in the corrected rotational speed.

Next, the controller 31 determines whether the amount of change S in the corrected rotational speed computed at step S23 exceeds the pinching determining threshold value β (step S24).

When it is determined that the amount of change S in the corrected rotational speed exceeds the pinching determining threshold value β (step S24; YES), the controller 31 performs a pinched object releasing process for releasing the pinched object (step S25). Then, the operation ends. Specifically, in the pinched object releasing process, the controller 31 reverses the rotation of the motor 23 to lower the window glass 11 by the predetermined amount.

In contrast, when it is determined that the amount of change S in the corrected rotational speed does not exceed the pinching determining threshold value β (step S24; NO), the controller 31 moves to step 26.

At step S26, it is determined whether the pulse count corresponds to the fully closed state of the window glass 11. When the pulse count corresponds to the fully closed state (step S26; YES), the process is ended. In contrast, when the pulse count does not corresponds to the fully closed state (step S26; NO), the controller 31 moves to step S27, and the pulse count is incremented by one. Then, the controller 31 returns to step S12.

Furthermore, in the present embodiment, the opening and closing member control system of the present invention is applied to the power window system 1 of the vehicle. However, the present invention is not limited to this. Alternatively, the opening and closing member control system may be applied to any opening and closing member control system for operating an opening and closing member, such as a sunroof window panel or a slide door.

Additional advantages and modifications will readily occur to those skilled in the art. The invention in its broader terms is therefore not limited to the specific details, representative apparatus, and illustrative examples shown and described.

What is claimed is:

1. An opening and closing member control system comprising:
    a drive means for driving an opening and closing member in an opening direction and a closing direction;
    a moving speed sensing means for outputting a speed measurement signal, which indicates a moving speed that corresponds to movement of the opening and closing member driven by the drive means; and
    a pinching sensing means for sensing pinching of an object by the opening and closing member based on the speed measurement signal, wherein:
    the pinching sensing means prestores a plurality of first amounts of change in the moving speed, each of which is computed based on the speed measurement signal that is previously received while the opening and closing member is driven in the closing direction, each of the plurality of first amounts of change in the moving speed being associated with a corresponding one of a plurality of divided ranges, into which a moving range of the opening and closing member is divided, the opening and closing member being movable within the moving range, each of the plurality of first amounts of change in the moving speed serving as learning stored data;

the pinching sensing means computes a second amount of change in the moving speed at a current position of the opening and closing member based on the speed measurement signal that is received while the opening and closing member is driven in the closing direction;

the pinching sensing means computes a difference between the second amount of change in the moving speed and the learning stored data, which is associated with one of the plurality of divided ranges that corresponds to the current position of the opening and closing member; and the pinching sensing means confirms the pinching of the object by the opening and closing member by a comparison between the difference and a pinching determining threshold value.

2. The opening and closing member control system according to claim 1 wherein:

the pinching sensing means senses a start of the pinching of the object when the difference exceeds a change determining threshold value;

the pinching sensing means computes a total amount of the difference since time of sensing the start of the pinching of the object; and the pinching sensing means confirms the pinching of the object by the opening and closing member when the total amount exceeds the pinching determining threshold value.

3. The opening and closing member control system according to claim 1, wherein the pinching sensing means increases the pinching determining threshold value on a negative side when the difference exceeds a disturbance determining threshold value that is set on a positive side.

4. The opening and closing member control system according to claim 1, wherein:

the drive means includes a motor;

the moving speed sensing means outputs a rotational speed signal of the motor as the speed measurement signal; and the pinching sensing means uses an amount of change in the rotational speed of the motor per unit interval, which is computed based on the rotational speed signal, as the amount of change in the moving speed.

5. The opening and closing member control system according to claim 1, wherein the pinching determining threshold value is corrected based on the difference.

6. The opening and closing member control system according to claim 1, wherein the opening and closing member is a window panel of a vehicle.

7. An opening and closing member control system comprising:

a drive means for driving an opening and closing member in an opening direction and a closing direction;

a moving speed sensing means for outputting a speed measurement signal, which indicates a moving speed of the opening and closing member and a position of the opening and closing member in a movable range, within which the opening and closing member is movable; and a pinching sensing means for sensing pinching of an object by the opening and closing member based on the speed measurement signal, wherein:

the pinching sensing means includes a memory that stores data map indicating a relation between (a) a first amount of change in the moving speed of the opening and closing member and (b) the position of the opening and closing member in the movable range while the opening and closing member is driven in the closing direction;

the pinching sensing means computes a second amount of change in the moving speed at a current position of the opening and closing member based on the speed measurement signal that is received while the opening and closing member is driven in the closing direction;

the pinching sensing means computes a difference between (a) the second amount of change in the moving speed of the current position and (b) the first amount of change in the moving speed stored in the memory, the first amount being learned based on the current position of the opening and closing member by referring to the map data; and the pinching sensing means confirms the pinching of the object by the opening and closing member by a comparison between the difference and a pinching determining threshold value.

8. The opening and closing member control system according to claim 7 wherein:

the pinching sensing means senses a start of the pinching of the object when the difference exceeds a change determining threshold value;

the pinching sensing means computes a total amount of the difference since time of sensing the start of the pinching of the object; and the pinching sensing means confirms the pinching of the object by the opening and closing member when the total amount exceeds the pinching determining threshold value.

* * * * *